R. L. WILLITS.
ELEVATING CONVEYER.
APPLICATION FILED OCT. 15, 1910.
1,070,759.
Patented Aug. 19, 1913.
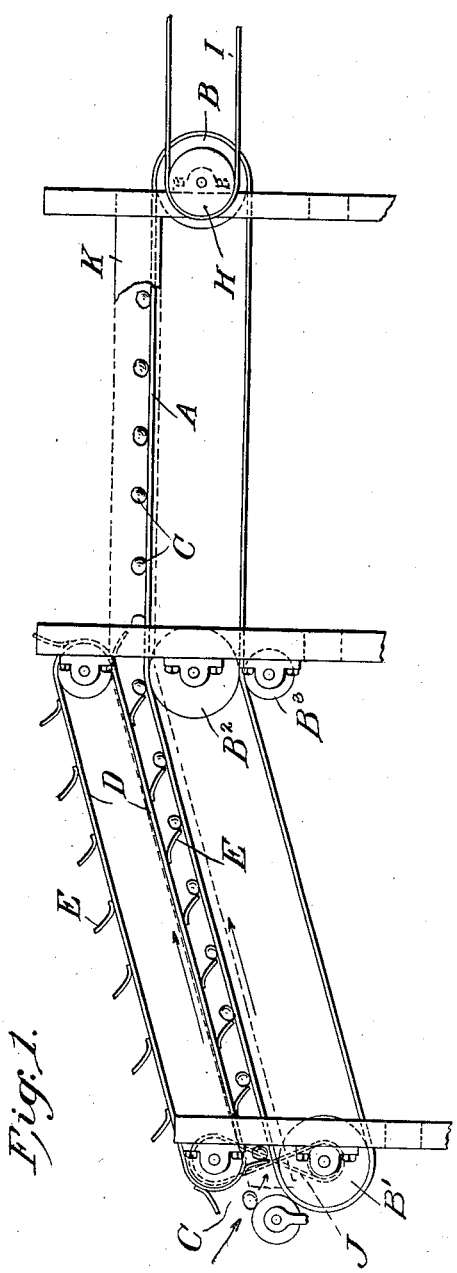
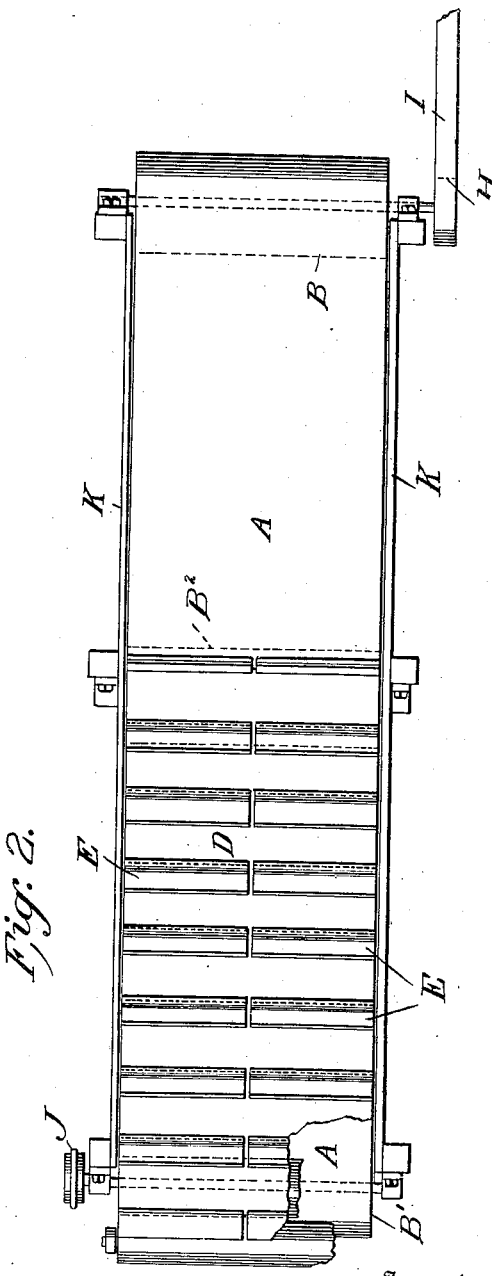

UNITED STATES PATENT OFFICE.

ROBERT L. WILLITS, OF CORONA, CALIFORNIA, ASSIGNOR TO GEORGE D. PARKER, OF RIVERSIDE, CALIFORNIA.

ELEVATING-CONVEYER.

1,070,759.  Specification of Letters Patent.  Patented Aug. 19, 1913.

Application filed October 15, 1910. Serial No. 587,200.

*To all whom it may concern:*

Be it known that I, ROBERT L. WILLITS, citizen of the United States, residing at Corona, in the county of Riverside and State of California, have invented certain new and useful Improvements in Elevating-Conveyers, of which the following is a specification, reference being had therein to the accompanying drawing.

The general object of this invention is to provide for automatically, safely, and rapidly conveying and elevating such fruit as is very easily bruised or injured in handling.

The invention is shown as embodied in apparatus for conveying fruit up an incline and then horizontally, for some distance, by endless belt conveyers combined in a novel way. Above and at a short distance from the inclined upper fold of a fruit supporting belt is a parallel fold of another belt provided with yielding wings or flaps of leather or the like which travel in the same direction as the inclined portion of the lower belt and preferably at a slightly lower speed, whereby the inertia of the fruit is largely overcome by the tangential pull of the lower belt and is compelled to ascend by the supplemental slight push of the yielding wings, no sudden blow or shock being given to the fruit at any stage of the proceeding.

In the accompanying drawings, Figure 1 is a side elevation of so much of an apparatus as is necessary to show the invention and its operation. Fig. 2 is a plan view of the same apparatus, parts being removed.

In these views, A represents an endless belt carried upon parallel horizontal drums B, B', B², B³, the first two being at different heights and the last two being idlers which change the direction of the middle portion of the belt. That portion of the upper fold of the belt which runs from the drum B' to the drum B² is upwardly inclined while the portion between the latter drum and the drum B is approximately horizontal and may serve as a sorting table. Fruit, oranges C, for example, is delivered to the lower part of said inclined portion, but as this belt is plain the fruit would not be elevated unless the angle were made very small if no other devices were supplied. Such additional devices should be such that the fruit cannot be injured thereby, and with that point in mind I make use of a second endless belt D above the first and having its lower fold parallel to the inclined portion of the first belt and far enough therefrom so that the fruit may pass between the two. This belt bears a series of flexible wings or flaps E of leather or the like, each having one end fixed to the belt and its free portion extending rearwardly and curved away from the belt as shown. This belt travels in the same direction as the inclined portion of the other belt but at a different and preferably at a slightly lower speed as indicated in the drawings.

It is preferred to make the speed of the upper belt the slower because in that case, no matter what the absolute speeds or the difference in speeds, no material impact of the wings upon the oranges is possible. With the reverse arrangement, that is with the lower belt the slower, the impact depends upon the difference in speed. With proper difference in speeds, however, the result is nearly the same in the two constructions mentioned. If oranges, C, for example, be delivered upon the lower belt at the lower end of its inclined portion, that belt imparts to them a force tending to carry them up the incline but not quite adequate because the frictional engagement is slight and the fruit rolls or slides back with respect to the belt. The fruit is however engaged by the wings after the lower belt has largely overcome its inertia, and hence it easily and gently takes on the motion of the wings, the shock being still less because the wings are themselves somewhat soft and elastic like cushioned springs. The fruit is always struck by the broad face of the wing which impels it onward, and there is never any danger of injuring the fruit, even if the belts be run at a higher speed than is usually desired.

The belts may be driven in any suitable way, but for illustration the lower belt is shown as driven by a pulley H and belt I, and the upper belt as actuated by a belt J and pulleys upon the shafts of two belt drums belonging to the belts, respectively.

To prevent fruit from escaping laterally from the lower belt, side pieces K are provided at each margin of the belt and so arranged that they and the belt itself form a sort of trough, for the fruit.

What I claim is:

1. In apparatus of the class described, the combination with an endless conveyer belt adapted to allow oranges and the like to roll freely on all parts of its carrying surface, and having an upwardly inclined portion, of a second endless belt moving at a slightly different speed, having an inclined fold above and parallel to said inclined portion, and provided with projections adapted to engage oranges supported on said portion.

2. The combination with an endless belt having an inclined portion down which oranges may roll, of a second endless belt moving at slightly different speed, having an inclined fold above and parallel to said inclined portion, and provided with a series of projections adapted to engage oranges upon said inclined portion and compel them to advance at the speed of the latter belt while acted upon by the faster moving belt.

3. The combination with an endless belt down which oranges and the like may be freely rolled by gravity having an upwardly inclined portion, of a second belt moving at a slightly different rate, having one part thereof parallel to and above said inclined portion, and provided with yielding transverse wings projecting in position to engage oranges upon said inclined portion.

4. The combination with an endless belt having an upwardly inclined portion down which oranges and the like may readily roll, of a second wing bearing belt having one part above and parallel to said inclined portion but leaving the lower part of said portion exposed to receive fruit to be elevated, and means for driving the belts at different speeds.

5. The combination with an endless belt adapted to allow oranges and the like to roll freely along all parts of its carrying surface adapted to support oranges, and having a portion of one fold constantly in a horizontal plane and another portion arranged to move obliquely upward toward said plane, of a second slower moving belt having a portion above and parallel to the upper part, only, of said inclined portion, and wings of yielding resilient material secured to the upper belt and arranged to engage the rear sides of oranges supported upon said inclined portion.

In testimony whereof I affix my signature in presence of two witnesses.

ROBERT L. WILLITS.

Witnesses:
　WILLIAM G. RANDALL,
　SANGER E. FRENCH.